E. E. SLICK.

METAL CAR.

APPLICATION FILED NOV. 9, 1920.

Reissued Apr. 18, 1922. 15,340.

Inventor
Edwin E. Slick
by Barnett & Ruman
Attorneys.

UNITED STATES PATENT OFFICE.

EDWIN E. SLICK, OF WESTMONT BOROUGH, PENNSYLVANIA ASSIGNOR TO WALTER P. MURPHY, OF NEW YORK, N. Y.

METAL CAR.

15,340. Specification of Reissued Letters Patent. Reissued Apr. 18, 1922.

Original No. 1,292,899, dated January 28, 1919, Serial No. 233,132, filed May 7, 1918. Application for reissue filed November 9, 1920. Serial No. 422,957.

*To all whom it may concern:*

Be it known that I, EDWIN E. SLICK, a citizen of the United States, and a resident of the borough of Westmont, in the county of Cambria and State of Pennsylvania, have made certain new and useful Improvements in Metal Cars, of which the following is a specification.

My improvement relates to the construction of metal cars with particular reference to the side and end plates thereof, including hopper, gondola, box and other types of cars.

One of the objects of my invention is to provide a car side plate or end plate of stiff, strong and substantial form without the use of additional stiffening pieces or separate side stakes secured to the car side, such as heretofore used in such constructions, and other objects of my invention will hereinafter appear.

With these objects in view my invention consists generally of a car plate formed preferably by pressing a steel or other metal plate with a plurality of integral panels or corrugations which preferably have sloping sides and sloping ends, the edge portions of the plate being preferably left flat for ease of attaching to the other members of the car and to provide a tight junction at these portions.

In addition to providing an integral stiff and strong car plate in the manner described, without the addition of extra parts and the labor connected with the same, my plate with outpressed panels also provides a larger capacity in the car body, especially in hopper and gondola cars which carry bulk ladings such as coal, mineral, etc., all of which advantages result in economy and usefulness.

Having thus given a general description of my invention, I will now, in order to make the matter more clear, refer to the annexed sheet of drawings forming part of this specification and in which like characters refer to like parts.

Figures 1, 2, 3:
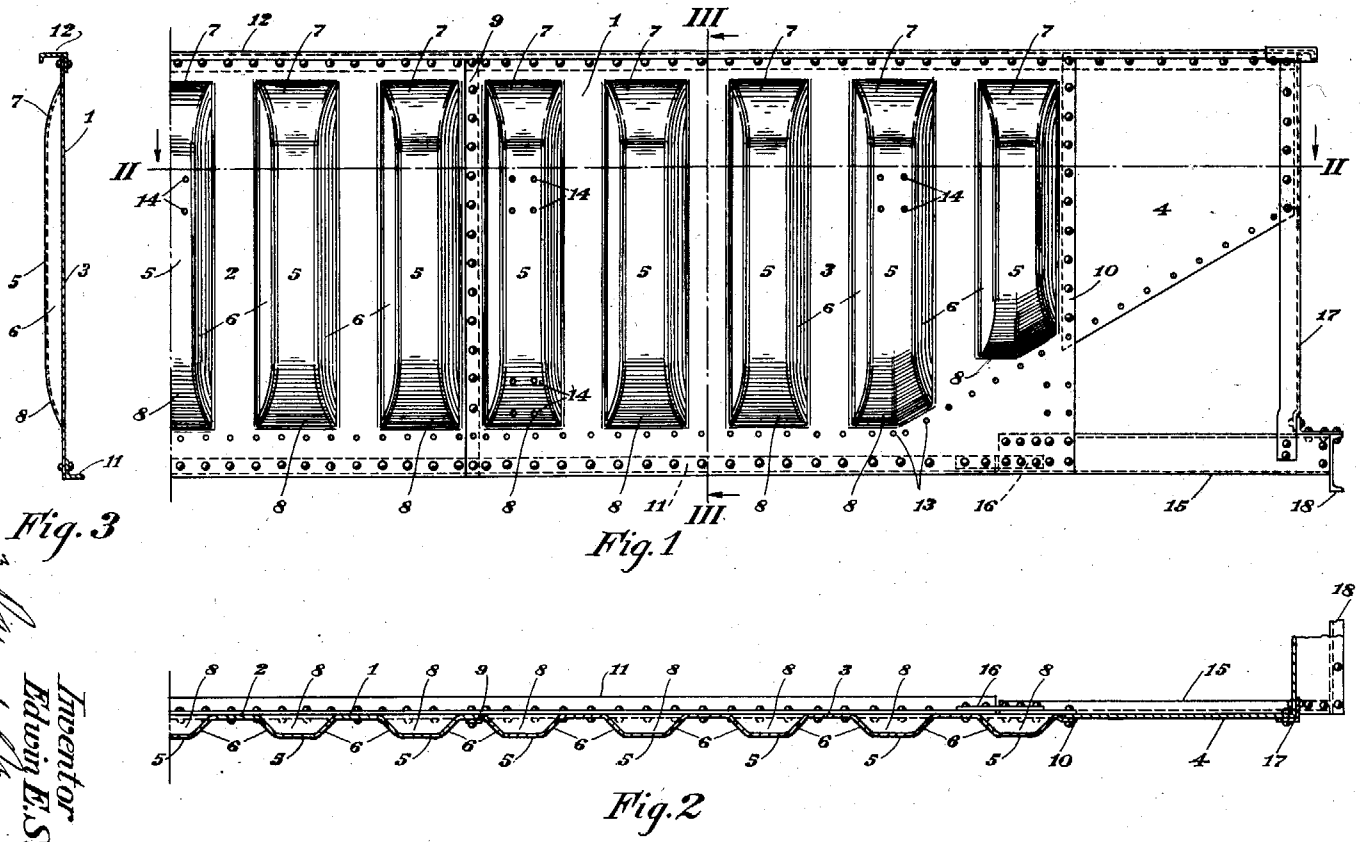
Fig. 1 is a side elevation of one-half of a hopper car side illustrating my invention.
Fig. 2 is a longitudinal sectional elevation taken on the line II—II of Fig. 1.
Fig. 3 is a vertical transverse sectional elevation taken on the line III—III of Fig. 1.

Referring now to the various characters of reference on the drawings:

1 is the side plate of the car in general, which, as illustrated, is preferably formed of a number of plates, 2 being one-half of the central section, 3 the intermediate section and 4 the end section, the end section being illustrated as a flat plate, as this portion is comparatively short and may not require the integral stiffening provided on the other portions. These plates are provided with corrugations or panels, preferably formed by pressing from a flat plate, the central portions of the outstanding panels or corrugations being indicated as 5, the sloping sides thereof 6 and the sloping and somewhat curved ends are 7 and 8. These panels may be pressed outwardly to any extent desired, to make them as deep as necessary and, on account of the distance of the outer portions of the panel from the body of the plate, this provides a large amount of lateral strength and stiffness, thereby obviating the necessity for any applied side stakes, stiffening angles, or similar extraneous strengthening portions.

Although I have shown the panels with sloping side and end portions and substantially flat outer faces and the cross section of the plate through the panels at right angles to their axes as being substantially symmetrical about the center line of the panel, I wish it understood that I may make these panels of other forms such as of more nearly rectangular section, preferably with rounded corners or may make them more generally curved or of other shapes to meet the requirements of stiffness and strength. It should also be noted that the panels of the intermediate plate are formed with sloping ends and of different lengths and conformation corresponding with the slope of the bottom sheet of the hopper car. In order to complete the illustration, I also show the joinder or splicing of the intermediate and center plates by a lap joint at 9, one of the plates being preferably offset, as illustrated, and a similar lap joint between the intermediate and end plates, as illustrated at 10. In order to complete the construction of the car side, it is also provided with a bottom angle 11 which may be located, as shown, or may have the horizontal leg turned outwardly, if desired, and the top of the plates is provided with an angle 12, shown as a bulb angle, to act as the top chord member of the side which, in service, functions as a plate girder. 13 are rivet holes in the side plates for attachment of floor and hopper plates on the inside of the car. 14 are rivet holes used for securing cross braces which extend from the side of the hopper car in the interior thereof. The side sub-sill indicated as a channel is 15, the splice or connecting plate for same is 16, one of the car end braces is 17 and the end sill, shown as a channel, is 18.

Although I have described and illustrated my invention in considerable detail, I do not wish to be limited to the exact and specific details thereof, as shown and described, but may use such modifications in, substitution for, or equivalents thereof, as are embraced within the scope of my invention, or as pointed out in the claims.

Having thus described my invention, what I claim and desire to secure by Letters Patent is:

1. In a metal car, a plate or plates provided with a plurality of integral upright panels extending from same, the margins adjacent said panels being substantially flat and provided with flanged members riveted thereto to provide additional strength and stiffness, thereby obviating the use of separate side stakes.

2. In a metal car, a side composed of one or more plates provided with a plurality of integral upright panels extending therefrom, thereby obviating the use of separate side stakes, the sides and ends of the panels being sloping, the body of the plate and the outer faces of the panels being substantially flat and parallel, and flanged members secured to said plate at the top and bottom margins thereof to form chords.

3. A metal car wall composed of a single thickness of plate metal provided with a plurality of substantially parallel integral panels extending from and continuously across the same and terminating near opposite edges thereof, thereby obviating the use of additional stiffening pieces; the side and end portions of said panels gradually sloping and merging into the body portion, the margin and intermediate portions of the plate being substantially plane, the margins being provided with flanged members secured thereto for the purpose of strengthening and stiffening the construction.

4. A metal car wall composed of a single thickness of plate metal provided with a plurality of integral panels extending therefrom of approximately rectangular outline with sloping sides and end portions extending continuously across said wall and terminating near opposite edges thereof, and adapted to strengthen and stiffen the same laterally, thereby obviating the use of additional stiffening pieces, the margin and intermediate portions of said plate being substantially plane, the upper and lower margins each provided with a rolled angle secured thereto, thereby strengthening and stiffening the plate girder side and acting in part as the chords thereof.

5. A metal car wall composed of a single thickness of plate metal provided with a plurality of integral panels projecting from and with their sides and ends sloping into the same and extending continuously across the wall and terminating near opposite edges thereof, thereby obviating the use of additional stiffening pieces, the central portions of the panels and the edge portions of said plate being plane and the latter being adapted to be secured to the car frame.

6. A metal car wall composed of a single thickness of plate metal provided with a plurality of integral approximately rectangular panels with plane central portions and with sloping sides and ends extending from said plate and continuously across the wall and terminating near the edges thereof, thereby obviating the use of additional stiffening pieces, the margins of the plate being plane.

7. A metal car plate provided with a plurality of integral upright panels extending therefrom thereby obviating the use of separate side stakes, said panels having sloping sides and end portions, the portions between said panels and the margins of the plate being substantially flat.

8. A metal car plate provided with a plurality of integral upright panels with sloping side and end portions and substantially flat outer portions, margins and intermediate portions, thereby obviating the use of separate side stakes.

9. A metal car plate, the body portion of which is flat and provided with a plurality of upright integral panels extending from same, the sides and ends of said panels sloping to the body of the plate, thereby obviating the use of separate side stakes.

10. A metal car wall composed of a single thickness of plate metal provided with a plurality of outwardly extending integral panels of rectangular outline at the base and with sloping sides and end portions, and adapted to strengthen and stiffen the plate laterally, thereby obviating the use of additional stiffening pieces, the margins and intermediate portions of said plate being substantially plane.

11. A metal car wall composed of a single thickness of plate metal provided with a plurality of substantially parallel integral projecting panels of substantially uniform width, extending continuously across the wall and terminating near opposite edges thereof, the side and end portions gradually sloping and merging into the body portion, the central portions of the panels, the margins and intermediate portions of said plate being plane, thereby obviating the use of additional stiffening pieces.

12. A metal car wall composed of a single thickness of plate metal provided with a plurality of integral panels of greater width than depth projecting from and with their sides and ends sloping into the same, and extending continuously across the wall and terminating near opposite edges thereof thereby obviating the use of additional stiffening pieces, the central portions of the panels and the edge portions of said plate being plane and the latter being adapted to be secured to the car frame.

In testimony whereof I hereunto affix my signature.

EDWIN E. SLICK.